US007542588B2

(12) United States Patent
Ekin et al.

(10) Patent No.: US 7,542,588 B2
(45) Date of Patent: Jun. 2, 2009

(54) SYSTEM AND METHOD FOR ASSURING HIGH RESOLUTION IMAGING OF DISTINCTIVE CHARACTERISTICS OF A MOVING OBJECT

(75) Inventors: Ahmet Ekin, Eindhoven (NL); Arun Hampapur, Fairfield, CT (US); Sharathchandra U. Pankanti, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 578 days.

(21) Appl. No.: 10/836,075

(22) Filed: Apr. 30, 2004

(65) Prior Publication Data

US 2005/0244033 A1 Nov. 3, 2005

(51) Int. Cl.
G06K 9/00 (2006.01)
H04N 9/47 (2006.01)
H04N 7/18 (2006.01)
(52) U.S. Cl. .................. 382/103; 348/143; 348/152
(58) Field of Classification Search ................ 382/103, 382/104, 115–124, 209; 348/152–154, 143
See application file for complete search history.

(56) References Cited

U.S. PATENT DOCUMENTS

| 6,252,975 | B1 | 6/2001 | Bozdagi et al. ............. 382/107 |
| 6,393,054 | B1 | 5/2002 | Altunbasak et al. ......... 375/240 |
| 6,433,706 | B1 | 8/2002 | Anderson, III et al. ...... 340/937 |
| 6,700,487 | B2 | 3/2004 | Lyons et al. ................ 340/541 |
| 6,970,576 | B1 * | 11/2005 | Tilsley ........................ 382/103 |
| 7,027,083 | B2 * | 4/2006 | Kanade et al. .............. 348/159 |
| 7,102,666 | B2 * | 9/2006 | Kanade et al. .............. 348/159 |
| 2002/0030741 | A1 | 3/2002 | Broemmelsiek ............ 348/169 |
| 2002/0063711 | A1 | 5/2002 | Park et al. ................... 345/428 |
| 2002/0186148 | A1 | 12/2002 | Trajkovic et al. ........... 340/936 |

(Continued)

OTHER PUBLICATIONS

Kim et al, "Automatic face region tracking for highly accurate face recognition in unconstrained environments", Proceedings. IEEE Conference on Advanced Video and Signal Based Surveillance, 2003. Publication Date: Jul. 21-22, 2003 On pp. 29-36.*

(Continued)

*Primary Examiner*—Jingge Wu
*Assistant Examiner*—Andrae S Allison
(74) *Attorney, Agent, or Firm*—Yea & Associates, P.C.; Anne V. Dougherty

(57) ABSTRACT

A system and method for assuring a high resolution image of an object, such as the face of a person, passing through a targeted space are provided. Both stationary and active or pan-tilt-zoom cameras are utilized. The at least one stationary camera acts as a trigger point such that when a person passes through a predefined targeted area of the at least one stationary camera, the system is triggered for object imaging and tracking. Upon the occurrence of a triggering event in the system, the system predicts the motion and position of the person. Based on this predicted position of the person, an active camera that is capable of obtaining an image of the predicted position is selected and may be controlled to focus its image capture area on the predicted position of the person. After the active camera control and image capture processes, the system evaluates the quality of the captured face images and reports the result to the security agents and interacts with the user.

19 Claims, 3 Drawing Sheets

U.S. PATENT DOCUMENTS

| | | | |
|---|---|---|---|
| 2003/0068100 A1 | 4/2003 | Covell et al. | 382/305 |
| 2003/0122667 A1 | 7/2003 | Flynn | 340/540 |
| 2003/0142209 A1 | 7/2003 | Yamazaki et al. | 348/143 |
| 2003/0174865 A1 | 9/2003 | Vernon | 382/105 |
| 2005/0012817 A1* | 1/2005 | Hampapur et al. | 348/143 |
| 2005/0111696 A1* | 5/2005 | Baer | 382/103 |

OTHER PUBLICATIONS

Zhou et al, "A Master-Slave System to Acquire Biometric Imagery of Humans at a Distance," ACM SIGMM 2003 Workshop on Video Surveillance, Berkeley, CA, Nov. 7, 2003, pp. 113-120.*

Stillman et al, "A System for Tracking and RecognizingMultiple People with Multiple Cameras", Georgia Institute of Technology,Graphics, Visualization and Usability Center, TechnicalReport # GIT-GVU-98-25, Aug. 1998.*

Trivedi et al, "Intelligent environments and active camera networks", Systems, Man, and Cybernetics, 2000 IEEE International Conference on Publication Date: 2000 vol. 2, On pp. 804-809 vol. 2.*

Bar-Noy, "Approximating the Throughput of Multiple Machines in Real-Time Scheduling", Society for Industrial and Applied Mathematics, 2001, vol. 31, No. 2, pp. 331-352.*

Comaniciu, "Adaptive Resolution System for Distributed Surveillance", Real-Time Imaging 8, 427-437 (2002).*

Lienhart et al., "A Detector Tree of Boosted Classifiers for Real-Time Object Detection and Tracking", Microcomputer Research Labs, Intel Corporation, Santa Clara, CA., 4 pages.

Lienhart et al., "Empirical Analysis of Detection Cascades of Boosted Classifiers for Rapid Object Detection", Microcomputer Research Labs, Intel Corporation, Santa Clara, CA., 8 pages.

Stillman et al., "A System for Tracking and Recognizing Multiple Pople with Multiple Cameras", Georgia Institute of Technology, Graphics, Visualization and Usability Center, Technical Report #GIT-GVU-98-25, Aug. 1998, pp. 1-6.

"Open CV Library Overview", 2004, http://www.intel.com/research/mrl/research/opencv/overview.htm, pp. 1-3, Apr. 4, 2004.

* cited by examiner

SYSTEM AND METHOD FOR ASSURING HIGH RESOLUTION IMAGING OF DISTINCTIVE CHARACTERISTICS OF A MOVING OBJECT

BACKGROUND OF THE INVENTION

1. Technical Field

The present invention is generally directed to a system and method for assuring high resolution imaging of distinctive characteristics of a moving object. More specifically, the present invention is directed to a system and method for assuring high resolution imaging of faces of persons passing through a targeted space.

2. Description of Related Art

In many security applications, high resolution images and video of certain objects are desired for robust object identification. In general, the known systems employ only wide-angle cameras to monitor a scene for which the detailed view of a certain location or an object in the scene cannot be generated. In only few cases, pan-tilt-zoom (PTZ or active) cameras are used to get higher resolution views of the interesting parts of a scene.

U.S. patent application 20030122667, entitled "System and Method for Enhancing Security at a Self-Checkout Station" (Flynn, S. W.) employs PTZ cameras in a supermarket to focus on the self-checkout stations where high-priority non-visual alerts are generated. Upon request, the application zooms to a predefined location for each checkout station. Hence, even a slight offset in the customer location from the assumed coordinates will prevent the system from capturing the customer in the high resolution image.

In U.S. patent application 20020063711, entitled "Camera System with High Resolution Image Inside a Wide Angle View" (Park, M. C. and Ripley, G. D.) a PTZ camera is used to highlight a high resolution image of an area in a panoramic view, which is generated by multiple single-lens cameras. The system lacks automatic detection of interesting segments and needs a manual specification of the area on which to focus. Hence, this system's use is labor-intensive.

In U.S. patent application 20020030741, entitled "Method and Apparatus for Object Surveillance with a Movable Camera" (Broemmelsiek, R. M.) an active camera maintains the object in the center of the field. This is mainly a tracking system where pan and tilt commands are executed for the lateral movements of the person, whereas the zoom value is adjusted when the object moves towards or away from the camera. Broemmelsiek's system adjusts the zoom value to keep the object size small enough so that the object can be tracked reliably with a minimum number of pan and tilt commands.

In some systems, salient color features of the object are used for detection. The technical report by S. Stillman, R. Tanawongsuwan, and I. Essa, entitled "A System for Tracking and Recognizing Multiple People with Multiple Cameras," Georgia Tech Technical Report#GIT-GVU-98-25, Aug. 1998 discloses the use of two wide-angle cameras to watch the global view of a scene while two PTZ cameras get higher resolution images of two people in the scene. The proposed system operates by first detecting skin (flesh) color pixels in the image data of single-lens cameras. After that, connected skin color regions are found by morphological operators and evaluated by shape and size constraints so that two skin colored regions with the highest face likelihood values are retained. Each PTZ camera is assigned to one distinct skin region and zooms in to capture high resolution image of the respective region. The system employs a face recognition engine, Face-It developer kit of Identix, to verify if a skin color blob corresponds to one of the pre-registered faces in the database. Similar to the system developed by Stillman et al., U.S. patent application 20030142209 (Yamazaki, S. and Tanibuchi, K.) also considers flesh color as an indicator of a face and captures high resolution views of flesh color regions by PTZ cameras.

Although skin (flesh) color is one of the necessary features of a face region, it is not a sufficient condition because visible non-face human body parts are indistinguishable from the face by only skin color. Furthermore, there may be skin colored objects, such as wooden furniture or doors in the environment which results in an increase in false alarms. Finally, although it is a very useful feature in computer vision, color is known to be highly sensitive to the illumination direction, intensity, reflection properties of surfaces, atmospheric conditions, and many other imaging and environmental factors.

Because of the motion of the active camera during the execution of pan, tilt, and zoom commands and possible object motion, high resolution images captured by a PTZ camera may be contaminated with motion blur. The implication of this is that although the system assumes the resolution of the captured image is high enough, the quality of the image may not be sufficient for certain applications as well as visual inspection. Some of the systems developed for license plate reading share similar concerns about the quality of the images, which may be blurred due to fast vehicle motion. An example of such a license plate reading system is described in U.S. patent application 20020186148, entitled "Combined Laser/Radar-Video Speed Violation Detector for Law Enforcement" (Trajkovic, M. et al.). In this system, active cameras are employed for image enhancement. Another license plate imaging system is described in U.S. patent application 20030174865, entitled "Vehicle License Plate Imaging and Reading System for Day and Night" (Vernon, M. W.) where the affects of illumination for day and night vision are taken into account when adjusting camera parameters. U.S. Pat. No. 6,433,706, entitled "License Plate Surveillance System" (Anderson III et al.) is yet another license plate reading system. This license plate reading system employs a camera that is mounted on a moving vehicle. None of these systems adequately address the problems associated with blurring due to movement of the active camera.

In the system of U.S. Pat. No. 6,700,487, entitled "Method and Apparatus to Select the Best Video Frame to Transmit to a Remote Station for CCTV Based Residential Security Monitoring" (Lyons et al.), a frame per event is detected and sent to the monitoring site to check for false alarms. The system deals only with static cameras and thus, the problems associated with the active cameras are not investigated.

U.S. patent application 20030068100, entitled "Automatic Selection of a Visual Image or Images from a Collection of Visual Images, Based on an Evaluation of the Quality of the Visual Images" (Covell et al.), proposes a quality evaluation scheme. With this quality evaluation scheme, for face images, a feature point analysis, such as the openness of both eyes, and a color-based flesh tone analysis are recommended. Camera motion is considered as a cue for the start of something interesting.

Patents that find solutions for key frame extraction from video, such as U.S. Pat. No. 6,252,975, entitled "Method and System for Real Time Feature Based Motion Analysis for Key Frame Selection from a Video" (Bozdagi et al.) and U.S. Pat. No. 6,393,054 "System and Method for Automatically Detecting Shot Boundary and Key Frame from a Compressed Video Data" (Altunbasak et al.), solve a different type of problem where the key frames represent the content changes in the frame sequences that are of comparable quality.

Known camera systems do not provide a robust camera system that assures a high resolution image of an object passing through a targeted space. The known systems suffer from various problems noted above that may cause the resulting images obtained from the camera system to have a resolution that is less than optimum for visual inspection or use with certain applications. Therefore, it would be beneficial to have an improved image capture system for assuring high resolution images of objects passing through a targeted space.

SUMMARY OF THE INVENTION

The present invention provides a system and method for assuring a high resolution image of an object, such as the face of a person, passing through a targeted space. The present invention makes use of stationary and active or pan-tilt-zoom cameras. In one exemplary embodiment, the system comprises at least one stationary camera and a plurality of active cameras. The at least one stationary camera acts as a trigger point such that when a person passes through a predefined targeted area of the at least one stationary camera, the system is triggered for object imaging and tracking. Upon the occurrence of a triggering event in the system, e.g., a person traveling through the predefined targeted area, the system predicts the motion of the person based on differences in frames of images obtained from the stationary camera. Other triggering events may be detected using one or more visual, infrared, mechanical, and/or magnetic sensors.

Based on the predicted motion of the person, a position of the person at a future time may be predicted. Based on this predicted position of the person, an active camera that is capable of obtaining an image of the predicted position is selected and may be controlled to focus its image capture area on the predicted position of the person. The active cameras may then perform face detection on images captured from the predicted position of the person. This process may be repeated continuously while the person is in the targeted area. In addition, an analysis of the frame-by-frame discrepancies of the active cameras may be utilized to aid in centering the object in their image capture areas.

After the active camera control and image capture processes, the system evaluates the quality of the captured face images and reports the result to the security agents and interacts with the user. The quality of the captured face images may be evaluated using any number of different algorithms. In one preferred embodiment, the quality of the captured face images is determined by comparing neighboring pixels over the entire image. If there are no large discrepancies between neighboring pixels overall, e.g., discrepancies that are greater than one or more predetermined thresholds, then the image is determined to not be a good quality image since blurring of the image is most likely present such that edges between features are not discernable. In another preferred embodiment, the quality of the image may be determined by taking the values for the pixels of every even (or odd) frame of the captured images and then attempting to predict the values for the pixels in the odd (or even) frame of the captured images. If the discrepancies between the predicted frame pixel values and the actual captured frame pixel values is greater than one or more predetermined thresholds, then the original image is not a good quality image.

The results of the quality analysis of the captured images may be provided to a user or security personnel as feedback to inform them if additional action is necessary. For example, in a security checkpoint application, the feedback from the present invention may be utilized to inform the security personnel that additional action is necessary in order to make sure that a good quality image of a person passing through the checkpoint is obtained. This may involve asking the person to stand and face one of the cameras so that their image may be captured.

The present invention solves the problems of the known systems by providing an object position prediction aspect to active camera imaging. That is, because stationary cameras are used to determine the motion of the object through the targeted space, a predicted position of the object is determined so that the active cameras can be controlled to train their image capture areas on the predicted position of the object. This means that the active camera is moved to the correct orientation prior to the object actually being in the predicted position. As a result, the active camera will be at rest when the object arrives at the predicted position and there is less likelihood of blurring due to the movement of the active camera.

In addition, because the present invention uses an image quality evaluation engine to evaluate the images that are captured during the actual image capturing operations, a real-time determination may be made as to whether additional action is necessary to obtain a good quality image of a particular object. As a result, the object may be placed in a position where a good quality image is assured to be captured. This solves the problem of the known systems in which image quality analysis may be performed long after the actual images are obtained and long after the objects are no longer available to obtain images of.

These and other features and advantages of the present invention will be described in, or will become apparent to those of ordinary skill in the art in view of, the following detailed description of the exemplary embodiments.

BRIEF DESCRIPTION OF THE DRAWINGS

The invention itself, as well as a preferred mode of use, further objectives and advantages thereof, will best be understood by reference to the following detailed description of an illustrative embodiment when read in conjunction with the accompanying drawings, wherein.

DETAILED DESCRIPTION OF THE EXEMPLARY EMBODIMENTS

An improved system and method for ensuring that high quality images are captured by an imaging system are provided. In accordance with the exemplary aspects of the present invention, video images obtained from stationary cameras are analyzed to determine if a triggering event has occurred. If so, the motion of an object of interest in the video capture area of the stationary cameras is determined and a predicted position of the object at a future point in time is generated based on the determined motion. This predicted position is used to control the pan, tilt and zoom (PTZ) of an active or PTZ camera so that the active camera is pointed at the predicted position prior to the object of interest being in the predicted position.

The active camera then obtains video images of the predicted position and provides these images for quality analysis. If the quality of one or more of the video images is above a threshold, then the images that exceed the threshold are stored in an image storage. If none of the images exceed the threshold, or less than a predetermined number of images exceed the threshold, an alarm is generated and sent to a user workstation so that corrective action may be taken. In addition, the images that are captured by the PTZ camera, and that are determined to be greater than a threshold with regard to quality, may be used with other external systems, such as transportation ticketing systems, law enforcement systems, and other systems, in order to perform additional functions based on the obtained images.

Figure 1:
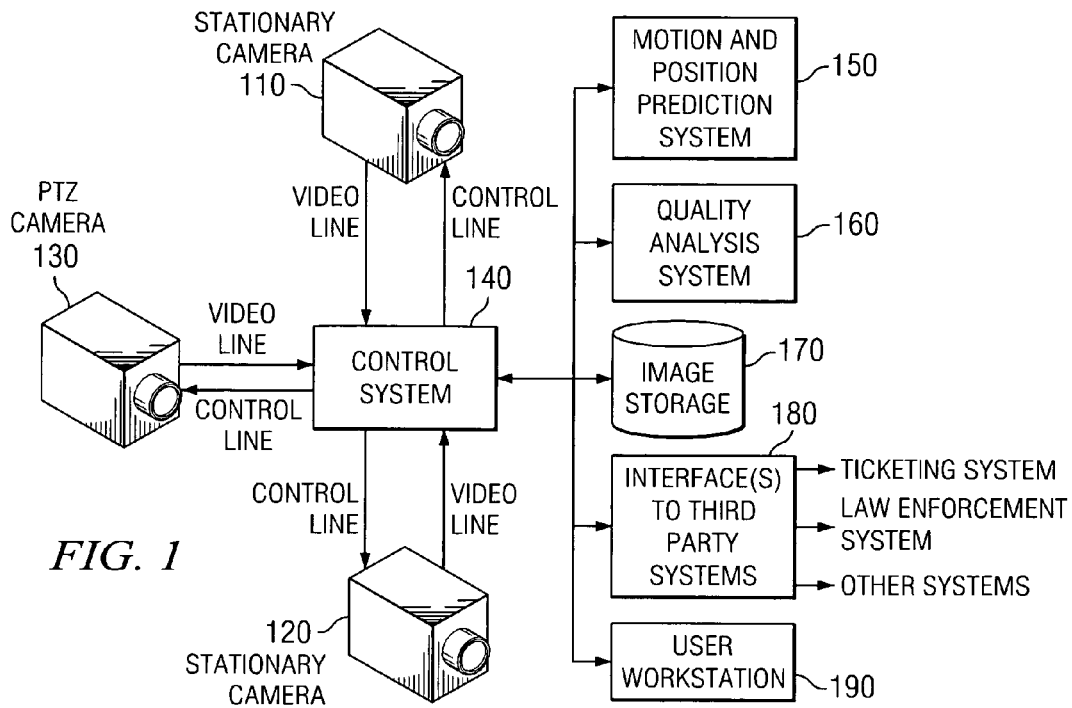
FIG. 1 is a diagram illustrating a high resolution imaging system in which the exemplary aspects of the present invention may be implemented.

FIG. 1 is a diagram illustrating a high resolution imaging system in which the exemplary aspects of the present invention may be implemented. As shown in FIG. 1, the high resolution imaging system of one preferred embodiment of the present invention includes one or more stationary cameras 110, 120 and at least one pan-tilt-zoom (PTZ) camera 130, also referred to as an "active" camera. The cameras 110-130 are electronically coupled to a central control system 140. The control system 140 is electronically coupled to a plurality of backend support systems and interfaces 150-190. These backend support systems and interfaces include a motion and position prediction system 150, an image quality analysis system 160, an image storage system 170, one or more interfaces to third party systems 180, and a user workstation interface 190.

The stationary cameras 110 and 120 provide video images captured from targeted areas to the control system 140. The stationary cameras 110 and 120 are preferably oriented so that they are focused on a targeted area where triggering events are typically to occur. The stationary cameras 110 and 120 are not moveable electronically instead are focused on an area until a manual adjustment of their orientation is performed. Thus, the stationary cameras 110 and 120 remain pointed toward the targeted area during operation of the system.

The stationary cameras 110 and 120 may be present in the same enclosure or may be geographically distributed. The stationary cameras 110 and 120 may be oriented so that they capture images from the same targeted area or from different targeted areas. In one exemplary embodiment of the present invention, the stationary cameras 110 and 120 may be geographically positioned and oriented so that they capture images from targeted areas that are adjacent one another approaching an area in which video images are captured by the active camera 130. Control may be switched from one camera 110 to another camera 120 based on detection of an object of interest traveling out of the targeted area of camera 110 into the targeted area of camera 120, as discussed hereafter.

The video images captured by the stationary cameras 110 and 120 are provided to the control system 140 which analyzes the frames of the video images to determine if a triggering event has been captured in the video images. A triggering event in the context of the present invention may be, for example, the detection of an object entering the targeted area of the stationary cameras, the detection of movement in a targeted area, or the like. The triggering event may be determined based on known image analysis mechanisms that are used to identify motion of objects within video images. For example, object detection and tracking analysis such as that described by Lienhart et al. in "A Detector Tree of Boosted Classifiers for Real-Time Object Detection and Tracking," DAGM'03, 25th Pattern Recognition Symposium, Madgeburg, Germany, pp. 297-304, September 2003 and "Empirical Analysis of Detection Cascades of Boosted Classifiers for Rapid Object Detection," IEEE ICME2003, July 2003, which are hereby incorporated by reference, may be used to detect and track object motion in video images captured by the stationary cameras 110 and 120. As another alternative, the object/motion detection and tracking mechanisms made available by Intel Corporation via its Open Computer Vision (CV) library may be used to detect and track objects and their motion using stationary cameras 110 and 120. The detection of objects and motion in the stationary camera video images may cause the triggering of the operation of the present invention with regard to controlling the active or PTZ camera 130 to capture high resolution images of the object.

The control system 140 may make use of the motion and position prediction system 150 to aid in the object detection and motion detection to determine if a triggering event has occurred. In addition, the motion and position prediction system 150 may take the motion detected in multiple frames of the video images captured by the stationary cameras 110 and 120 and determine motion parameters for the detected object based on the motion detected in multiple frames of the video images. For example, the velocity and direction of movement of the object may be determined based on changes in position within multiple frames of the video images, timestamps associated with the various frames of the video images, and the like. These motion parameters may be used to extrapolate the motion of the object so that a prediction of the position of the object at a future time may be determined. The position prediction may be generated using any known prediction algorithm. In accordance with exemplary aspects of the present invention, a Kalman filter-based prediction engine may be used to predict the future position of the object at a time t given the current position and velocity of the object. Other prediction mechanisms that are more or less complex than the Kalman filter approach may be used without departing from the spirit or scope of the present invention.

The position prediction may be provided by the motion and position prediction system 150 to the control system 140 so that the control system 140 may send appropriate control signals to the PTZ camera 130 to control the orientation of the PTZ camera 130. The control system 140 preferably receives the position prediction from the motion and position prediction system 150 and determines where the PTZ camera image capture area should be pointed in order to capture high quality images of the object detected and tracked by the stationary cameras 110 and 120.

These control signals are sent to the PTZ camera 130 so that the PTZ camera 130 moves to a proper orientation prior to the object arriving at the predicted position where a high quality image is to be captured. It is important to move the PTZ camera 130 before having to capture the image since movement of the PTZ camera 130 may cause blurring of any images captured while the PTZ camera 130 is in motion. Since it may take known electromechanical PTZ cameras 1 second to move 10 degrees, and known electromagnetic-mechanical PTZ cameras 0.3 seconds to move 10 degrees, due to mechanical inertia, it is important that the motion and position prediction system 150 predict a position at which the object will be at a time that is greater than a movement time of the PTZ camera 130 in the future. That is, if it takes the PTZ camera 130 an average of 1 second to move to a desired orientation, then the position prediction should be for a time greater than 1 second. This ensures that the PTZ camera 130 will be at rest when the images of the object are captured. As a result, blurring of the image due to motion of the camera will be minimized.

The images captured by the PTZ camera 130 are provided to the control system 140 which digitizes the images (if they have not already been digitized by the PTZ camera 130) and provides the digitized images to the quality analysis system 160. The quality analysis system 160 analyzes attributes of the captured images or frames and generates a quality rating for each frame with regard to pre-established image capture criteria. For example, the pre-established image capture criteria may designate that a high quality rating is afforded to those frames that have a clear image of a person's face. This may be determined by using known face recognition image analysis to identify whether features of a person's face are clearly identifiable in a captured image. If so, the captured image, or frame of video, is given a high quality rating. Other criteria may include, for example, parameters identifying a clear image of a vehicle's license plate, state inspection and registration stickers, and the like. Any criteria may be established based on the particular objects of interest to the user of the system of the present invention.

In addition, the quality analysis system 160 may include a blur analysis algorithm that analyzes the pixels of the captured images to determine if a blurry image has been captured. For example, the discrepancy between adjacent pixel color values may be determined and based on an overall analysis of the image, if the overall analysis indicates that there is not much variation in adjacent pixel colors, then a blurry image may be identified.

Based on the quality analysis performed by the quality analysis system 160, an indication of whether the captured image(s) are high quality or not is provided to the control system 140. The control system 140 may then store those images that are designated as high quality images in the image storage 170 along with a timestamp and other pertinent information regarding the capture of the images. In addition, a message may be generated and sent to the user workstation 190 indicating whether a high quality image of a particular object has been captured or not. This message provides feedback to the operator of the system so that the operator may take corrective action to ensure that at least one high quality image of the object is captured. For example, based on the analysis of the captured images, it may be determined that none of the captured images provides a high quality image of the object. As a result, a message may be generated and displayed, or audibly output, at the user workstation 190 indicating that a high quality image has not been captured. Accordingly, the operator may place the object at, or instruct the object to move to, a position where a high quality image is certain to be obtained from the PTZ camera 130. Alternatively, if at least one high quality image is obtained for the object, then a message indicating that a high quality image has been obtained may be sent to the user workstation 190 so that the operator is informed that no corrective action is necessary.

As a practical example of the present invention, if the present system is being used at a security checkpoint, such as in an airport, as each person approaches the security checkpoint, the stationary cameras 110 and 120 may identify the person's approach as a triggering event that causes the operation of the present invention with regard to predicting the motion and position of the person, controlling the orientation of the PTZ camera 130, and performing quality analysis of the resulting images captured by the PTZ camera 130. The images captured by the stationary cameras 110 and 120 may be analyzed by the motion prediction system 150 to generate a prediction of the position of the person at a future time point. As a result, the control system 140 generates control signals and transmits them to the PTZ camera 130 in order to orient the PTZ camera 130 on the predicted position of the person.

The PTZ camera 130 then, at the predicted point in time, begins to capture images of the targeted area around the predicted position of the person. The captured images are provided to the control system 140 which, in turn, provides them to the quality analysis system 160. The quality analysis system 160 evaluates the quality of the capture images against pre-established criteria for objects of interest, such as the face of the person, and determines if the captured images are of sufficiently high quality or not. If the quality analysis system 160 identifies at least one high quality image, the image or frame of video is stored in the image storage 170 along with a timestamp and other pertinent information from the high quality imaging system of the present invention, e.g., checkpoint identifier, camera identifier, etc. In addition, a message may be generated and sent to the user workstation 190 indicating that a high quality image of the person was captured and no further action is necessary on the part of the operator.

If the quality analysis system 160 determines that none of the images captured by the PTZ camera 130 are of a sufficient quality, then the quality analysis system 160 may generate a message that is sent to the user workstation 190 requesting that the operator take corrective action to obtain a high quality image of the person. Such action may include positioning the person in front of the PTZ camera 130 and instructing them to look at the camera so that an image may be obtained.

It should be appreciated that the above operations of predicting the motion and position of the object, sending control signals to the PTZ camera, and capturing images using the PTZ camera 130 may be performed a plurality of times with regard to the same object while a high quality image capture is attempted. Thus, the messages sent to the user workstation 190 may occur only after a predetermined number of images are analyzed with the result being that at least one high quality image is either obtained or not obtained. In this way, the PTZ camera 130 may track the object for a short period of time while it attempts to capture a high quality image. This tracking may be performed by providing images captured by the PTZ camera 130 to the motion and position prediction system 150 which predicts the position of the object based on the motion detected in the images of the PTZ camera 130. As a result, the orientation of the PTZ camera 130 may be updated so as to "track" the movement of the object.

During this tracking, the quality analysis system 160 is analyzing the images captured by the PTZ camera 130. Once a high quality image is obtained by the PTZ camera 130, the tracking may be discontinued, the message may be sent to the user workstation 190, and the system may be reset for the next object. Alternatively, after a predetermined number of attempts to capture a high quality image, a message may be sent to the user workstation 190 requesting that the operator position the object for high quality image capture.

It should also be appreciated that with multiple PTZ cameras 130, multiple objects may be tracked by the same system. Thus, as a first PTZ camera 130 is attempting to obtain a high quality image of a first object, the stationary cameras 110 and 120 may be capturing images for motion and position prediction of another object such that the control system 140 may send control signals to another PTZ camera 130. In this way, virtually continuous tracking of multiple objects may be obtained through a targeted area.

As a further aspect of the exemplary embodiments of the present invention, the high quality imaging system of the present invention may operate in conjunction with third party systems via the interfaces 180 to correlate high quality images captured and stored by the present invention with information maintained in other third party systems. For example, if the security checkpoint example used above is expanded such that at the security checkpoint, the person's airline ticket is read by a computer or information pertaining the person's identity were input by a user via the user workstation, this information may be stored in the image storage 170 along with the high quality image captured by the PTZ camera 130. This information may then be correlated with an airline ticketing system that provides additional information about the user's travel accommodations. Such a feature may be used for security reasons so that images of the individuals traveling on the various aircraft may be maintained in the case of a security problem, for recognition purposes in the event of a catastrophic event, or the like. Moreover, such interfacing with a ticketing system may be used for more service oriented reasons such as identifying first class travelers and providing them with additional conveniences while waiting to board the aircraft. The captured images of the persons may be output to flight attendants or airline personnel so that they may identify the first class travelers for special attention.

The high quality imaging system of the present invention may also interface with law enforcement systems in order to compare high quality images stored in the image storage 170 with images resident in law enforcement systems. In this way, images may be compared to determine if any of the persons passing through the security checkpoint pose a security risk due to the persons being wanted criminals, terrorists, or the like. The high quality imaging system may also interface with other third party systems to provide other security precautions and services as would be readily understandable to those of ordinary skill in the art in view of the present description.

Thus, the present invention provides a system and method for ensuring that high quality images of objects of interest are captured for later use. Because the present invention uses a first set of stationary cameras to predict motion and position, the active or PTZ camera may be oriented so that it is at rest when it is attempting to capture a high quality image of the object of interest. In this way, blurring of the captured images due to movement of the PTZ camera is minimized.

In addition, the present invention performs dynamic analysis of the images captured by the PTZ camera to determine if a high quality image has been captured. Feedback is then provided to a user via a user workstation so that the user may take appropriate action to ensure a high quality image of the object is obtained, if necessary. In some exemplary embodiments, this feedback may be used to request the user (object in this case) to go through the image/video capture process until a high enough quality of his or her image is captured. As a result, a dynamic online evaluation of the image/video capture process is made possible. The main advantage of this type of feedback is that the system of the present invention can guarantee certain performance criteria for the whole process.

Furthermore, once the system has knowledge about the quality of an image, it can automatically associate the highest quality image, among the many captured images, to the object for search and retrieval, visual browsing, cataloging, and other related applications. Thus, the images, or only the highest quality image, may be stored in an image storage device, along with other information, and may be used in conjunction with third party systems to obtain other services.

The present invention has been described in terms of a plurality of separate systems, such as the control system 140, the motion and position prediction system 150, the quality analysis system 160, etc. Each of these systems may exist in a separate computing device, may be integrated into a single computing device, or portions of these systems may be combined into a single computing device while other portions are distributed amongst a plurality of computing devices. The depiction in the figures and the above description are not intended to express or imply limits on the possible configurations or configuration modifications that may become apparent to those of ordinary skill in the art in view of this description of the exemplary embodiments.

Figure 2:
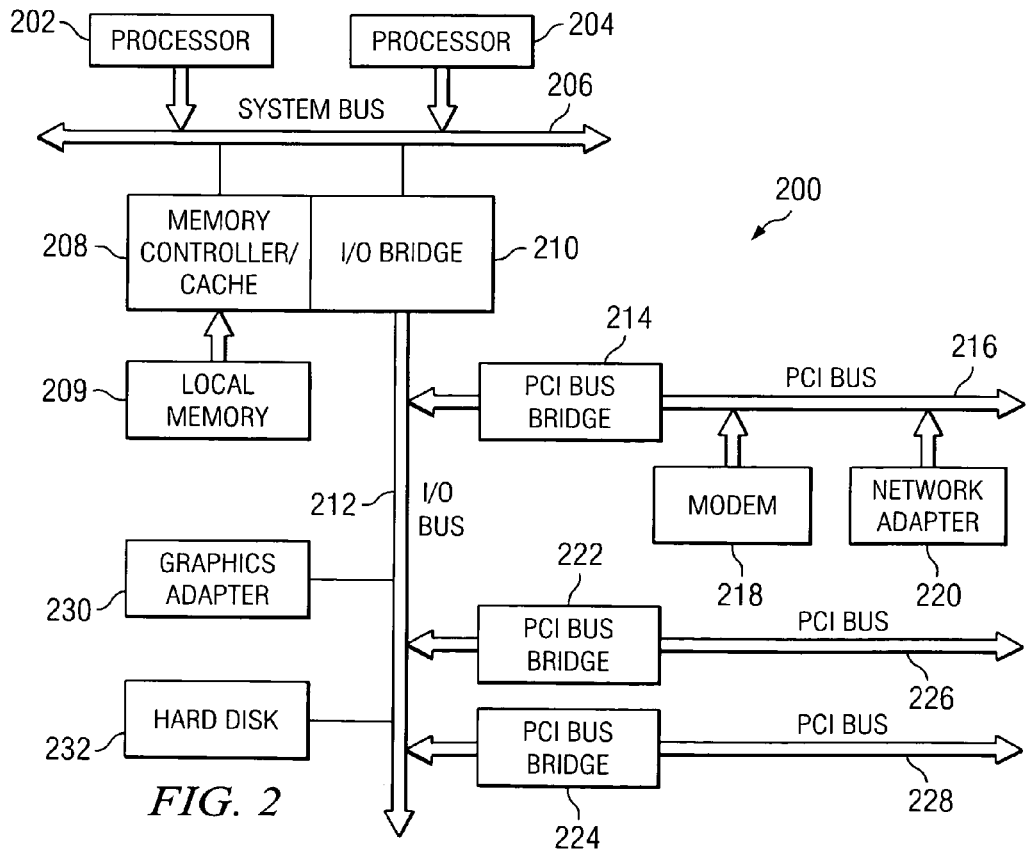
FIG. 2 is a diagram illustrating a computing device in which the exemplary aspects of the present invention may be implemented.

FIG. 2 is a diagram illustrating one type of computing device in which exemplary aspects of the present invention may be implemented. The computing device shown in FIG. 2 may be used to implement all of the functions of each of the systems shown in FIG. 1 or only a subset of the functions of the various systems in FIG. 1, depending on the particular implementation of the present invention. Thus, the computing device, or data processing system, illustrated in FIG. 2 may operate as control system 140, a combination of control system 140 and elements 150-190, or any sub-combination of elements 140-190.

As shown in FIG. 2, data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention and is only offered as an example computer architecture in which aspects of the present invention may be implemented. Computer architectures are quite widely varied and any computer architecture that would facilitate the functions of the present invention being performed is intended to be within the spirit and scope of the present invention. The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
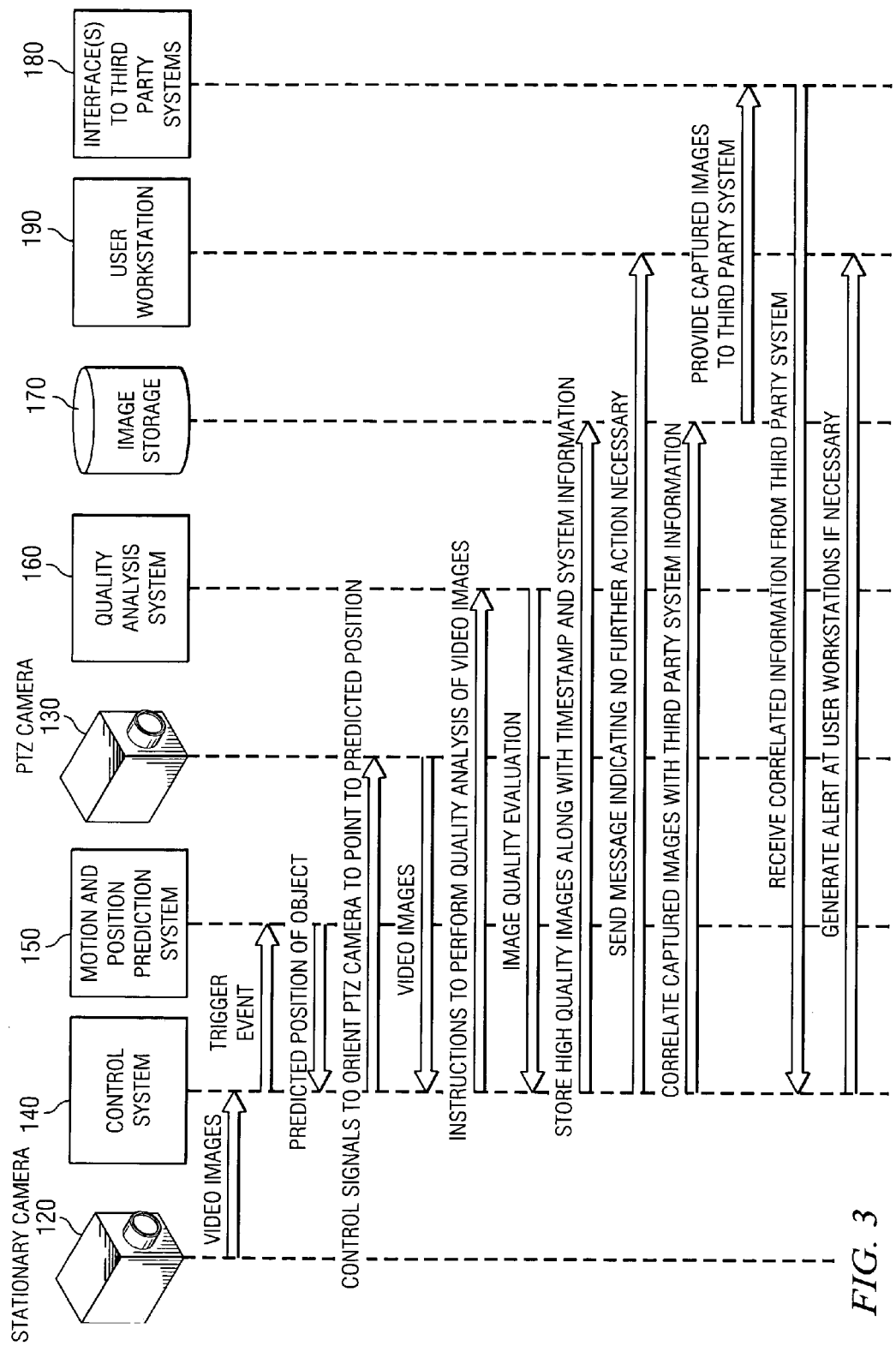
FIG. 3 is a diagram illustrating the interaction of the primary operational components of a high resolution imaging control/evaluation mechanism in accordance with exemplary aspects of the present invention.

FIG. 3 is a block diagram illustrating the interaction of the primary operational components of a high resolution imaging control/evaluation mechanism in which the exemplary aspects of the present invention may be implemented. The diagram shown in FIG. 3 assumes that the systems have been initialized for the capture of high quality images of particular types of objects. For example, the quality analysis system 160 has been trained or otherwise initialized to a state in which criteria for determining whether an image is of sufficient high quality are established. For example, the quality analysis system 160 may have pre-established criteria for determining whether an image is a high quality image of a person's face, a license plate of a vehicle, or the like.

As shown in FIG. 3, during operation the stationary cameras 120 provide video images to the control system 140. The control system 140 determines if there are any triggering events captured in the video images obtained from the stationary cameras 120. For example, movement detection or object detection may be used to determine a triggering event. The control system 140 may enlist the aid of the motion and position prediction system 150 in determining whether there is a triggering event or not in some embodiments. In other embodiments, the control system 140 may include a separate object detection or movement detection mechanism for detecting a triggering event.

If a triggering event is detected, the trigger event is communicated to the motion and position prediction system 150 which analyzes the video images received from the stationary cameras 120 to generate one or more predictions with regard to a position of an object in the video images at a future time. The predicted position of the object is returned to the control system 140. The control system 140 generates control signals to control the active, or PTZ, camera 130 to point to the predicted position of the object. The active, or PTZ, camera 130 then captures video images of the predicted position of the object and provides these video images to the control system 140. The active camera 130 may move based on continued updates to the predicted position of the object from the motion and position prediction system 150 to thereby track the object through a targeted area.

The video images captured by the active camera 130 are provided to the quality analysis system 160 which analyzes the video images to determine if there are any high quality images of objects of interest. That is, the quality analysis system 160 determines if the pre-established criteria are met by any of the video images captured by the active camera 130. In the depicted example, it is assumed that at least one of the images captured by the active camera 130 is a high quality image of an object of interest, such as a face of a person. However, in the case that none of the video images captured by the active camera 130 meet the pre-established criteria, a message may be generated and sent to the user workstation 190 instructing the operator to position the object so that a high quality image may be generated.

Assuming that at least one of the video images captured by the active camera 130 is of a high quality, as defined by the pre-established criteria for objects of interest, the high quality images are stored along with timestamp information and other system information in the image storage device 170. These images are indexed, such as by timestamp, and stored for later use and retrieval. In addition, a message may be sent to the operator, via the user workstation 190, indicating that no further action is necessary because a high quality image has been captured.

In a further embodiment of the present invention, the high quality images that were captured by the active camera 130 and stored in the image storage device 170 may be provided to a third party system for correlation with information stored in the third party system. Thus, the control system 140 may instruct the image storage device 170 to provide the captured images to the third party system and may receive information correlated with these images from the third party system. This information may include, for example, information identifying a person as a wanted criminal, a terrorist, or the like. Alternatively, this information may identify a person as a very important person (VIP) to which extra attention should be paid. Based on this information, an alert may be generated and sent to one or more user workstations if necessary.

It should be appreciated that while the examples provided above are with regard to security checkpoints in airports, the present invention is not limited to this type of application. To the contrary, the present invention is applicable to any situation or implementation in which the capture of high quality images of moving objects is desirable. Such applications may include grocery self-checkout stations, building security systems, hotel entrance monitoring equipment, parking garage security systems, and the like. The present invention is not limited in its uses to any one particular implementation and no limitation with regard to application of the present invention is intended or should be construed from the present description.

Figure 4:
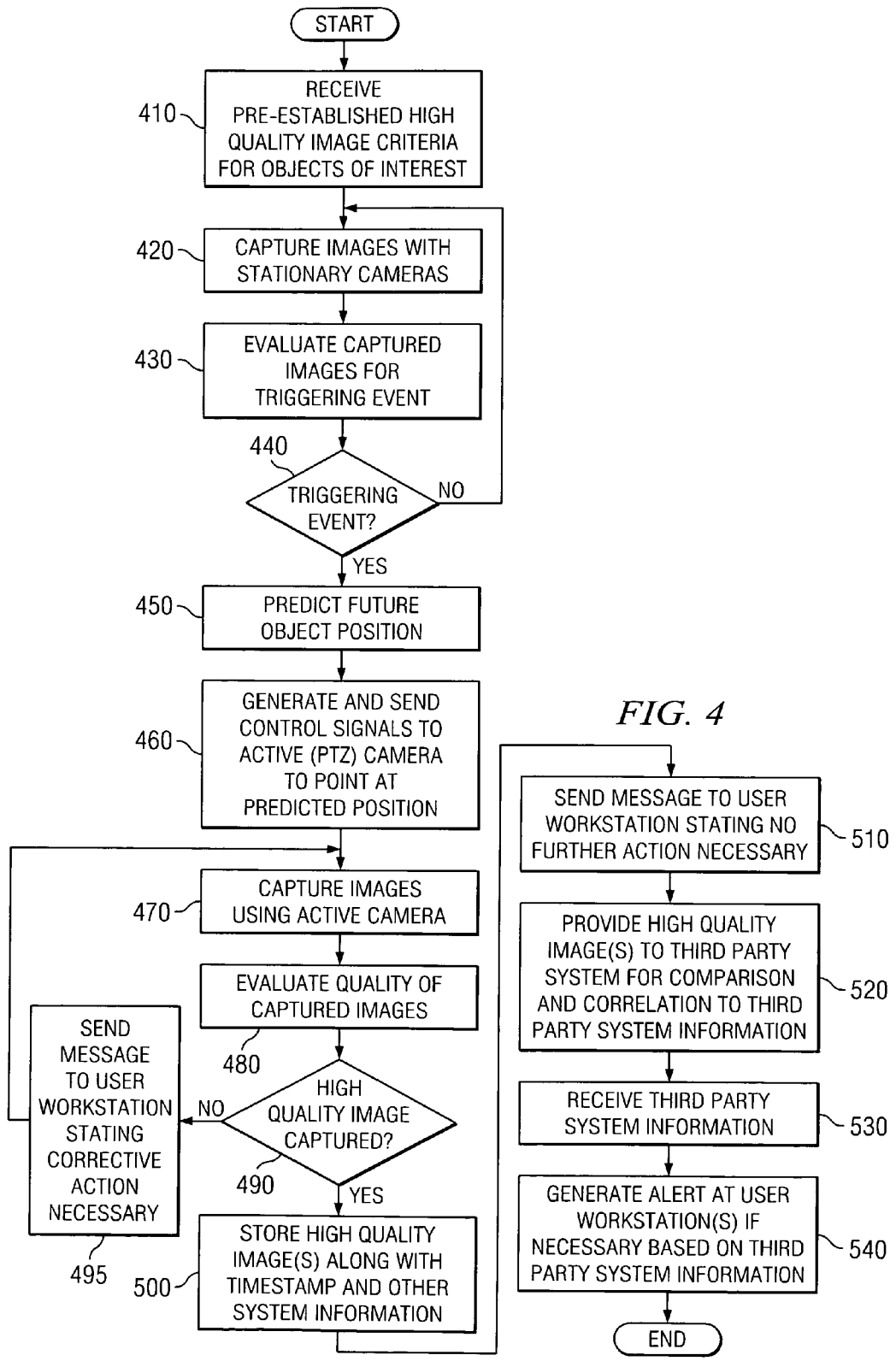
FIG. 4 is a flowchart outlining a process for obtaining high resolution images of a moving object using stationary and active cameras in accordance with exemplary aspects of the present invention.

FIG. 4 is a flowchart outlining a process for obtaining high resolution images of a moving object using stationary and active cameras in accordance with exemplary aspects of the present invention. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 4, the operation starts by receiving pre-established high quality image criteria for objects of interest (step 410). This criteria may be input to the system directly or may be learned using an artificial intelligence engine and training the artificial intelligence engine to recognize high quality images of objects of interest, for example. Thus, in one embodiment of the present invention, the quality analysis system of the present invention may include an artificial intelligence engine that is trained to recognize high quality images of a particular type, such as faces of people.

After having received the pre-established high quality image criteria for objects of interest, the present invention operates to capture images with stationary cameras (step 420). The captured images are evaluated for triggering events (step 430) and a determination is made as to whether the captured images include a triggering event (step 440). If not, the operation returns to step 420 and continues to capture images with the stationary cameras.

If a triggering event is present in the captured images from the stationary cameras, the future position of the object in the captured images is determined (step 450). Control signals are then generated and sent to the active camera(s) to point them at the predicted position of the object (step 460). The active camera(s) then capture images of the object at the predicted position (step 470). As previously mentioned above, this process may be repeated so that the object is "tracked" through a targeted area in order to give a greater likelihood that a high quality image of the object will be captured.

The quality of the captured images from the active camera is then evaluated (step 480) and a determination is made as to whether the captured images include at least one high quality image of the object (step 490). If not, a message is sent to a user workstation stating that corrective action is necessary (step 495). It is assumed that the operator then positions the object at a position in front of the active camera so that a high quality image may be obtained and the operation then returns to step 470.

If a high quality image has been captured, the high quality image(s) are stored along with timestamp information and other system information (step 500). A message may then be sent to the user workstation indicating that no further action on the part of the operator is necessary (step 510). The high quality images may then be provided to third party systems for comparison and correlation with third party system information (step 520). Third party system information may then be received (step 530) and, depending on the type of information received from the third party system, an alert may be generated at user workstation(s) if necessary (step 540). The operation then terminates.

Thus, the present invention, with regard to the exemplary embodiments described above, provides a mechanism for assuring high quality image capture of objects of interest. The prediction mechanisms of the present invention aid in reducing blur of images as well as correctly orienting active cameras to an orientation in which a high quality image is most likely to be obtained of an object of interest. The quality analysis mechanisms of the present invention provide dynamic online analysis and feedback so that in the case of a high quality image not being obtained, appropriate corrective action may be taken to ensure that a high quality image is captured. Moreover, the present invention provides a mechanism for interfacing with third party systems so that the high quality images captured by the present invention may be used in conjunction with these third party systems to obtain greater functionality.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for obtaining an image of an object of interest, comprising:

predefining a targeted area;

pointing a stationary camera at said targeted area, said stationary camera remaining pointed at said targeted area during operation of said data processing system;

generating a trigger in response to an object moving through said targeted area, wherein movement through said target area generates said trigger;

in response to said trigger:
  using said stationary camera to determine a motion of said object through said targeted area, said motion determined using a first set of video images of the object that were captured by the stationary camera as the object moved through said targeted area;
  using said motion determined using said first set of images to determine motion parameters;
  using said motion parameters to predict a future position of said object at a future time that is greater than a movement time of an active camera, wherein said object will arrive at said future position at or after, but not before, said future time, and further wherein said movement time is the time it takes said active camera to move to a desired orientation;

controlling said active camera to capture a second set of images of the object at the future position of the object;

evaluating a quality measure of each image in the second set of images;

storing an image from the second set of images if a quality measure of the image meets predetermined criteria; and wherein controlling said active camera to capture a second set of images of the object includes transmitting control signals to the active camera causing the active camera to be oriented to the future position prior to arrival of the object at the future position, the active camera being at rest when the capturing of the second set of images is initiated, wherein blurring of said second set of images due to movement of said active camera is reduced.

2. The method of claim 1, further comprising:

providing the image from the second set of images to an external system for comparison to image data stored in the external system;

determining if there is matching image data in the external system that matches the image from the second set of image; and correlating information associated with a matching image in the image data stored in the external system with the image from the second set of images.

3. The method of claim 2, further comprising:

generating an alert based on correlating the information associated with the matching image in the image data stored in the external system with the image from the second set of images.

4. The method of claim 1, wherein evaluating a quality measure of each image in the second set of images includes performing a blur analysis of the pixels of the images in the second set of images.

5. The method of claim 4, wherein performing a blur analysis of the pixels of the images in the second set of images includes:
   obtaining values for the pixels in a first image from the second set of images;
   predicting values for pixels in a second image from the second set of images; and
   comparing the predicted values for the pixels in the second image to actual values for the pixels in the second image to determine if the first image meets predetermined quality requirements.

6. The method of claim 1, wherein using said motion parameters to predict a future position of said object includes determining said motion of the object based on differences between frames of images in the first set of images to identify a speed and direction of motion of the object.

7. The method of claim 1, further comprising:
   sending a message to an operator workstation informing the operator that corrective action is necessary if none of the images in the second set of images has a quality measure that meets the predetermined criteria.

8. A computer program product that is stored in a computer readable medium in a data processing system for obtaining an image of an object of interest, comprising:
   instructions for predefining a targeted area;
   instructions for pointing a stationary camera at said targeted area, said stationary camera remaining pointed at said targeted area during operation of said data processing system;
   instructions for generating a trigger in response to an object moving through said targeted area, wherein movement through said target area generates said trigger;
   in response to said trigger:
      instructions for using said stationary camera to determine a motion of said object through said targeted area, said motion determined using a first set of video images of the object that were captured by the stationary camera as the object moved through said targeted area;
      instructions for using said motion determined using said first set of images to determine motion parameters;
      instructions for using said motion parameters to predict a future position of said object at a future time that is greater than a movement time of an active camera, wherein said object will arrive at said future position at or after, but not before, said future time, and further wherein said movement time is the time it takes said active camera to move to a desired orientation;
      instructions for controlling said active camera to capture a second set of images of the object at the future position of the object;
      instructions for evaluating a quality measure of each image in the second set of images;
      instructions for storing an image from the second set of images if a quality measure of the image meets predetermined criteria; and
      wherein controlling said active camera to capture a second set of images of the object includes transmitting control signals to the active camera causing the active camera to be oriented to the future position prior to arrival of the object at the future position, the active camera being at rest when the capturing of the second set of images is initiated, wherein blurring of said second set of images due to movement of said active camera is reduced.

9. The computer program product of claim 8, wherein the instructions for evaluating a quality measure of each image in the second set of images include instructions for performing a blur analysis of the pixels of the images in the second set of images.

10. The computer program product of claim 9, wherein the instructions for performing a blur analysis of the pixels of the images in the second set of images include:
   instructions for obtaining values for the pixels in a first image from the second set of images;
   instructions for predicting values for pixels in a second image from the second set of images; and
   instructions for comparing the predicted values for the pixels in the second image to actual values for the pixels in the second image to determine if the first image meets predetermined quality requirements.

11. The computer program product of claim 8, wherein the instructions for using said motion parameters to predict a future position of said object include instructions for determining said motion of the object based on differences between frames of images in the first set of images to identify a speed and direction of motion of the object.

12. The computer program product of claim 8, further comprising:
   instructions for sending a message to an operator workstation informing the operator that corrective action is necessary if none of the images in the second set of images has a quality measure that meets the predetermined criteria.

13. A data processing system for obtaining an image of an object of interest, comprising:
   a predefined targeted area;
   a stationary camera that is pointed at said targeted area, said stationary camera remaining pointed at said targeted area during operation of said data processing system;
   means for generating a trigger in response to an object moving through said targeted area, wherein movement through said target area generates said trigger;
   in response to said trigger:
      means for using said stationary camera to determine a motion of said object through said targeted area, said motion determined using a first set of video images of the object that were captured by the stationary camera as the object moved through said targeted area;
      means for using said motion determined using said first set of images to determine motion parameters;
      means for using said motion parameters to predict a future position of said object at a future time that is greater than a movement time of an active camera, wherein said object will arrive at said future position at or after, but not before, said future time, and further wherein said movement time is the time it takes said active camera to move to a desired orientation
   means for controlling said active camera to capture a second set of images of the object at the future position of the object;
   means for evaluating a quality measure of each image in the second set of images;
   means for storing an image from the second set of images if a quality measure of the image meets predetermined criteria; and
   wherein controlling said active camera to capture a second set of images of the object includes transmitting control signals to the active camera causing the active camera to be oriented to the future position prior to arrival of the object at the future position, the active camera being at rest when the capturing of the second set of images is initiated, wherein blurring of said second set of images due to movement of said active camera is reduced.

14. The system of claim 13, further comprising:
means for providing the image from the second set of images to an external system for comparison to image data stored in the external system;
means for determining if there is matching image data in the external system that matches the image from the second set of image; and
means for correlating information associated with a matching image in the image data stored in the external system with the image from the second set of images.

15. The system of claim 14, further comprising:
means for generating an alert based on correlating the information associated with the matching image in the image data stored in the external system with the image from the second set of images.

16. The system of claim 13, wherein the means for evaluating a quality measure of each image in the second set of images includes means for performing a blur analysis of the pixels of the images in the second set of images.

17. The system of claim 16, wherein the means for performing a blur analysis of the pixels of the images in the second set of images includes:
means for obtaining values for the pixels in a first image from the second set of images;
means for predicting values for pixels in a second image from the second set of images; and
means for comparing the predicted values for the pixels in the second image to actual values for the pixels in the second image to determine if the first image meets predetermined quality requirements.

18. The system of claim 13, wherein the means for using said motion parameters to predict a future position of said object includes means for determining said motion of the object based on differences between frames of images in the first set of images to identify a speed and direction of motion of the object.

19. The system of claim 13, further comprising:
means for sending a message to an operator workstation informing the operator that corrective action is necessary if none of the images in the second set of images has a quality measure that meets the predetermined criteria.

* * * * *